United States Patent [19]

Matsuura et al.

[11] Patent Number: 5,020,319
[45] Date of Patent: Jun. 4, 1991

[54] HOLLOW HEAT-RESISTING BODY ASSEMBLY FOR INTERNAL COMBUSTION ENGINE

[75] Inventors: Tooru Matsuura; Mitsuyoshi Kawamura; Yoshinori Narita, all of Nagoya, Japan

[73] Assignee: NGK Spark Plug Co., Ltd., Nagoya, Japan

[21] Appl. No.: 559,409

[22] Filed: Jul. 26, 1990

Related U.S. Application Data

[63] Continuation of Ser. No. 204,503, Jun. 9, 1988, abandoned.

[30] Foreign Application Priority Data

Jun. 9, 1987 [JP] Japan .................................. 62-88689
Aug. 25, 1987 [JP] Japan ................................ 62-128080

[51] Int. Cl.⁵ .............................................. F01N 7/06
[52] U.S. Cl. ....................................... 60/321; 60/323; 123/193 H

[58] Field of Search ................. 60/323, 321, 320, 282, 60/272; 123/193 H, 668, 270, 41.42

[56] References Cited

U.S. PATENT DOCUMENTS

| | | | |
|---|---|---|---|
| 3,877,126 | 4/1975 | Deutschmann | 60/272 |
| 3,919,755 | 11/1975 | Kaneko | 123/193 H |
| 4,277,539 | 7/1981 | Keller | 123/193 H |
| 4,528,108 | 7/1985 | Grover | 123/41.42 |
| 4,757,790 | 7/1988 | Ushio | 123/668 |

Primary Examiner—Douglas Hart
Attorney, Agent, or Firm—Foley & Lardner

[57] ABSTRACT

A heat-resistant casing for an internal combustion engine comprises an outer wall member made of an aluminum alloy by casting and an inner wall member made of ceramic and embedded in the outer wall member at the time of casting of the outer wall member. A coolant jacket is formed in the outer wall member and is communicated with a source of cooling medium so that cooling medium circulates through the coolant jacket.

3 Claims, 3 Drawing Sheets

HOLLOW HEAT-RESISTING BODY ASSEMBLY FOR INTERNAL COMBUSTION ENGINE

This application is a continuation, of application Ser. No. 07/204,503, filed Jun. 9, 1988.

BACKGROUND OF THE INVENTION

1. Field of the Invention

The present invention relates to a hollow heat-resisting body assembly for an internal combustion engine, as an exhaust manifold or turbine housing provided with a ceramic lining.

2. Description of the Prior Art

While it is desirable to maintain the temperature of the exhaust gases at a low level (600° C. to 650° C.) for lowering the back pressure of the exhaust gases and thereby reducing the loss of the engine output, it has recently been practiced, for the reason of purifying the exhaust gases and improving the responsiveness of an engine equipped with a turbocharger, to provide the exhaust port, exhaust manifold and the turbine housing with ceramic linings, respectively and thereby maintain the temperature of the exhaust gases at a high level (800° C. to 900° C.).

However, in case of providing the ceramic linings to the exhaust port, exhaust manifold and the turbine housing and thereby maintaining the temperature of the exhaust gases at a high level, large deformation, distortion, breakage, etc. are liable to occur in the metal body due to the repeated heating and cooling thereof. This may possibly affect the ceramic linings and cause play, breakage, etc. thereof.

SUMMARY OF THE INVENTION

In accordance with the present invention, there is provided a hollow heat-resisting body assembly for an internal combustion engine which comprises a hollow outer body made of cast metal, a hollow inner body made of ceramics and embedded in the outer body at the time of casting of the outer body, and a coolant jacket formed in the outer body.

The above structure is effective for solving the above noted problems.

It is accordingly an object of the present invention to provide a novel heat-resisting body assembly for an internal combustion engine which can prevent large deformation, distoration, cracks breakage, etc. otherwise occuring in the metal portion and ceramic portion thereof.

It is another object of the present invention to provide a novel exhaust manifold for an internal combustion engine of the above described character which enables the temperature of the exhaust gases to be maintained at a high level.

It is a further object of the present invention to provide a novel exhaust manifold of the above described character which can improve the responsiveness of the engine.

It is a further object of the present invention to provide a novel turbine housing for a turbocharger for an integral combustion engine of the above described character.

DETAILED DESCRIPTION OF THE PREFERRED EMBODIMENTS

Figure 1:
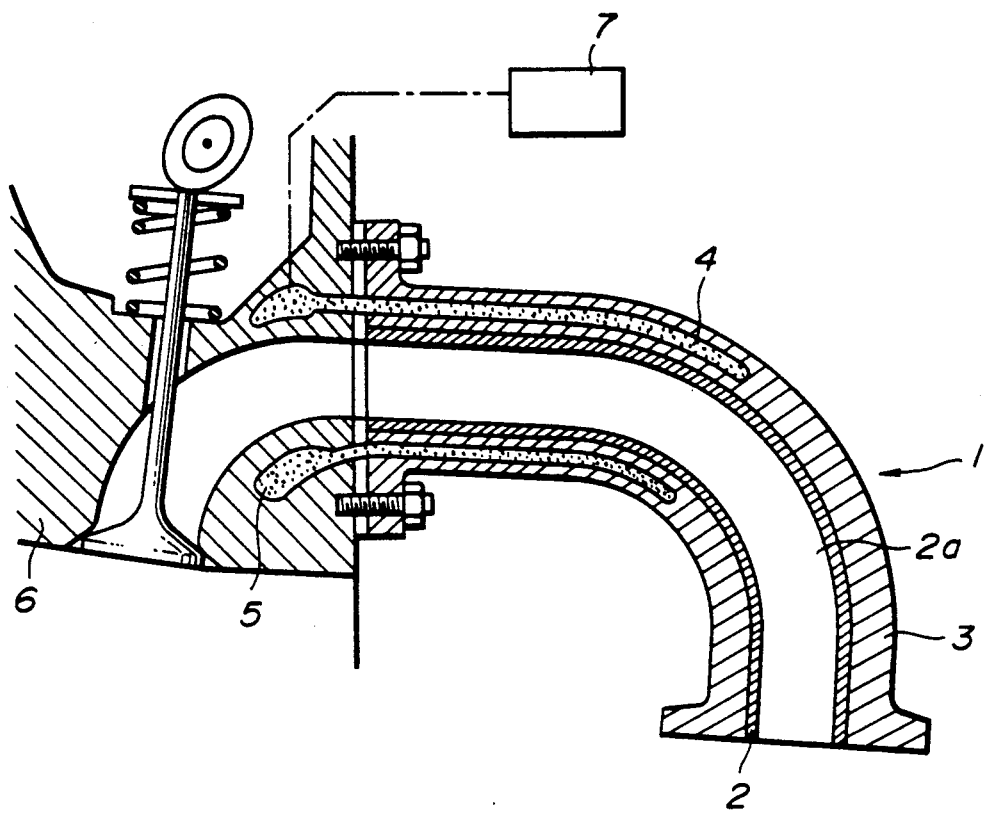
FIG. 1 is a sectional view of an exhaust manifold for an internal combustion engine according to an embodiment of the present invention, together with a portion of a cylinder head including an exhaust port and an exhaust valve.

Referring first to FIG. 1, an exhaust manifold for an internal combustion engine according to an embodiment of the present invention is generally indicated by the reference numeral 1 and shown as comprising an inner tubular member 2 formed from a sintered body of an aluminum titanate and an outer tubular member 3 formed from an aluminum alloy and a coolant passage or jacket 4 formed in the outer tubular member 3. The inner tubular member 2 is adapted to define an exhaust passage 2a and embedded in the outer tubular member 3 at the time of casting of the outer tubular member 3, i.e., the outer tubular member 3 is cast around the inner tubular member 2 by using the inner tubular member 2 as a core. The coolant jact 4 is formed into a tubular shape to surround the exhaust passage 2a and communicated with a water jacket 5 of an engine cylinder head 6. The water jacket 5 is communicated with a source of cooling medium or a radiator 7 so as to transmit hot water thereto and receive cooled water therefrom.

The engine equipped with the exhaust manifold 1 of this invention was operated for 100 hours at the revolution of 4000 rpm, coolant temperature of 80° C. and the exhaust gas temperature of 850° C., and after the engine was stopped it was subjected to cooling by operating the electric fan of the radiator 7 for five minutes. By the above test, it was found that nothing abnormal was caused in the aluminum alloy portion 3 and the ceramic portion 2. In the meantime, the maximum temperature of the aluminum alloy portion 3 during the operation of the engine was about 180° C.

Figure 2:
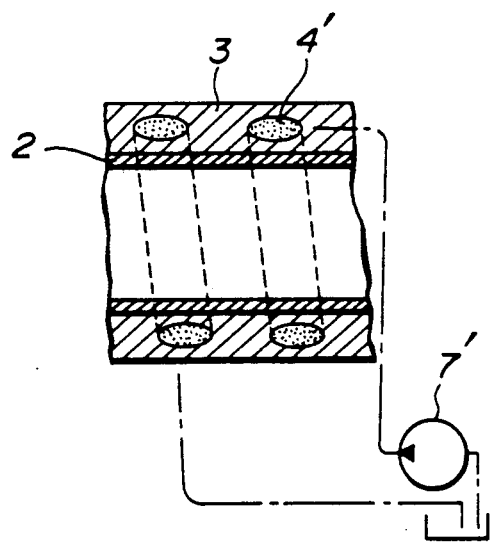
FIG. 2 is a fragmentary section view of a varient of the embodiment of FIG. 1.

FIG. 2 shows a modification of the present invention. This embodiment is substantially similar to the previous embodiment of FIG. 1 except that the coolant passage or jacket 4' is formed into a coiled shape and that oil adapted to be maintained at about 80° C. is used as cooling medium in place of water. The coolant passage 4' is thus fluidly connected to a source of cooling medium or oil pump 7' so that oil circulates through the coolant passage 4'. Test was conducted in substantially the same way as above except that oil was used as cooling medium in place of water and urged by the oil pump 7' to flow through the coolant passage 4' for five minutes, and it was found that nothing abnormal was caused both in the aluminum alloy portion 3 and the ceramic portion 2.

Though not shown, test was further conducted with respect to an example for comparison which was substantially similar to the embodiment of FIG. 1 except that the example for comparison was not provided with the coolant passage 4 or 4', and it was found that after 80 hours' operation of the engine cracks were caused in the aluminum alloy portion and also in the ceramic portion in the place thereof corresponding to the place where the cracks were caused in the aluminum alloy portion. The temperature of the aluminum alloy portion during operation of the engine was 350° C.

Figure 3:
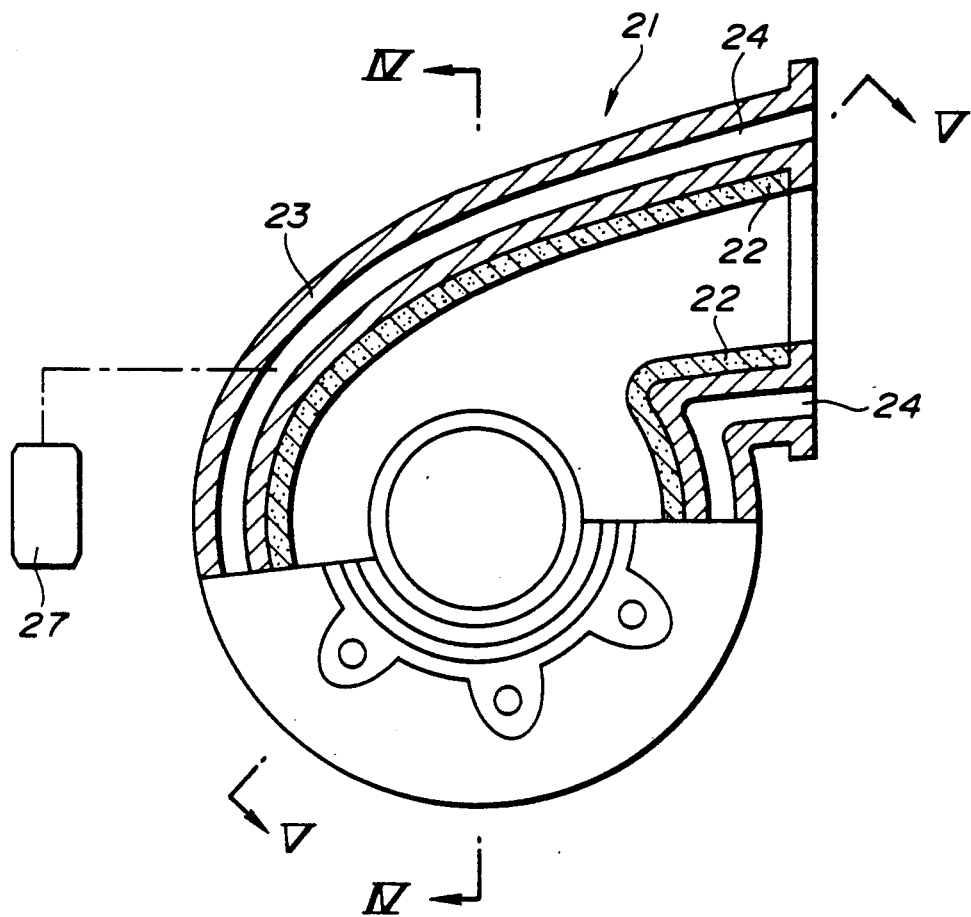
FIG. 3 is a partly sectioned, side elevational view of a turbine housing according to another embodiment of the present invention.
Figure 4:
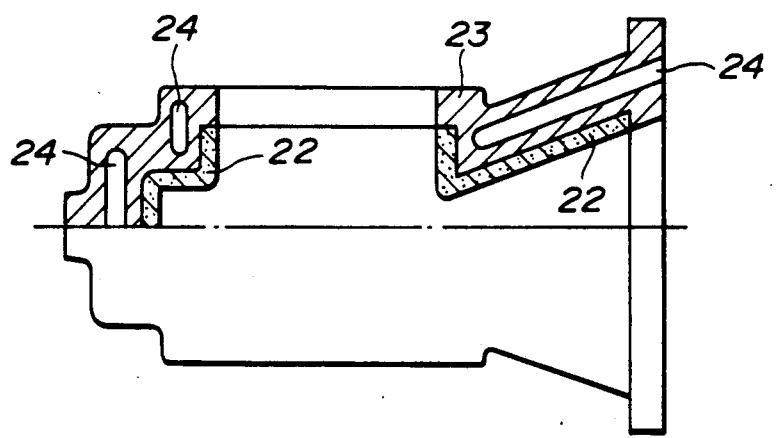
FIG. 4 is a sectional view taken along the line IV—IV of FIG. 3.
Figure 5:
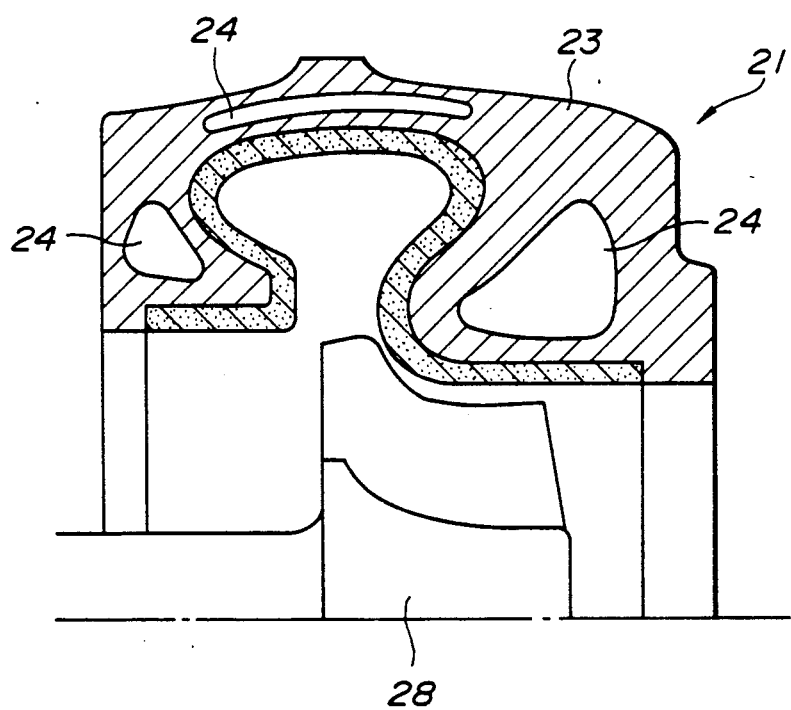
FIG. 5 is an enlarged, fragmentary sectional view taken along the line V—V of FIG. 3.

FIGS. 3 to 5 show a turbine housing for a turbocharger according to another embodiment of the present invention. The turbine housing is generally indicated by the reference numeral 21 and shown as comprising an inner wall member 22 made of ceramics which is mainly composed of aluminum titanate or coordierite or made of a composite material including ceramic fibre, an outer wall member 23 made of an aluminum alloy and a coolant passage or jacket 24 formed in the outer wall member 23. The inner wall member 22 is embedded in the outer wall member 24 at the time of casting of the outer wall member 24, i.e., the outer wall member 23 is cast around the inner wall member 22 by using the inner wall member 22 as a core. The coolant jacket 24 is communicated with a source of cooling medium 27 so that the inner and outer wall members 22 and 23 of the turbine housing 21 are cooled by cooling medium as water or oil flowing through the coolant jacket 24.

In this connection, when oil is used as cooling medium, constant and assured cooling of the turbine housing 21 is obtained since oil can effect a good cooling action even at a high temperature.

It is desirable to circulate cooling medium through the passage 24 by means of an electric pump or the like cooling medium 27 even after stoppage of the engine in order to prevent large deformation, destortion, cracks, etc. otherwise occuring in the aluminum alloy outer wall 23 and the ceramic inner wall 22 since after stoppage of the engine the temperature within the turbine housing 21 can possibly become so high as to cause such deformation, distortion, cracks, etc.

The turbine housing 21 having installed therein a turbine wheel 28 of an outer diameter of 60 mm was tested under the conditions that the temperature or coolant water is 80° C., the temperature of the exhaust gases 900° C., the turbine wheel 28 was operated at 12,000 rpm, and the operation of the turbine wheel 28 was repeated cyclically in such a manner that one test cycle was comprised of one minute's operation and 30 second' stoppage. By this test, it was found that nothing abnormal was caused in the turbine housing 21 of this invention but a prior art example for comprision which was not provided with a coolant passage or jacket was caused to deform after 20 test cycles and be contacted by the turbine wheel to be broken. Test was conducted in another way that was substantially similar to the above except that cooling of the turbine housing was made by oil of the temperature of 80° C. and that after stoppage of the engine oil was circulated through the coolant jacket 24 for three minutes by means of an electric oil pump, and it was found that nothing abnormal was caused in the turbine housing 21 of this invention.

What is claimed is:

1. An exhaust manifold for an internal combustion engine, comprising:
    an outer tubular member made of an aluminum alloy by casting;
    an inner tubular member made of aluminum titanate and embedded in said outer tubular member at the time of casting of said outer tubular member; and
    a coolant jacket formed in said outer tubular member wherein said coolant jacket is formed into a coiled shape.

2. An exhaust manifold as set forth in claim 1, further comprising means for circulating cooling medium through said coolant jacket.

3. An exhaust manifold as set forth in claim 1 wherein said coolant jacket is communicated with a radiator.

* * * * *